United States Patent [19]
Lin et al.

[11] Patent Number: 5,671,310
[45] Date of Patent: Sep. 23, 1997

[54] OPTICAL FIBER CONNECTOR HAVING AN ADJUSTABLE ENGAGING EXTENT

[75] Inventors: I-En Lin; Bill Fong, both of Hsin Chu, Taiwan

[73] Assignee: Tai Jin Mold Mfg. Co., Ltd., Hsin Chu, Taiwan

[21] Appl. No.: 558,736

[22] Filed: Nov. 16, 1995

[51] Int. Cl.$^6$ .................................................. G02B 6/38
[52] U.S. Cl. ................................................. 385/78; 385/87
[58] Field of Search ................................. 385/76–78, 86, 385/87

[56] References Cited

U.S. PATENT DOCUMENTS

| | | | |
|---|---|---|---|
| 4,812,009 | 3/1989 | Carlisle et al. | 385/62 |
| 5,016,970 | 5/1991 | Nagase et al. | 385/60 |
| 5,052,774 | 10/1991 | Bulman et al. | 385/86 |
| 5,091,990 | 2/1992 | Leung et al. | 385/87 X |
| 5,212,752 | 5/1993 | Stephenson et al. | 385/78 |
| 5,222,169 | 6/1993 | Chang et al. | 385/87 |
| 5,293,582 | 3/1994 | Beard et al. | 385/78 |

FOREIGN PATENT DOCUMENTS

| | | |
|---|---|---|
| 179740 | 7/1992 | Taiwan . |
| 211312 | 1/1994 | Taiwan . |
| 216211 | 3/1994 | Taiwan . |
| 251704 | 7/1994 | Taiwan . |

*Primary Examiner*—John D. Lee
*Attorney, Agent, or Firm*—Knobbe, Martens, Olson & Bear, LLP

[57] ABSTRACT

The present invention provides an optical fiber connector adapted for connecting an optical fiber carried in the optical fiber connector to an optical cable, which comprises a plug, a ferrule assembly mounted in the plug, a retention member engaged with the plug, and having a first end and a second end, a resilient element mounted between the ferrule assembly and the retention member, a crimp member having a third end and a fourth end engaging with the second end, an extension member connecting thereto the optical cable, attached to the crimp member at the crimp member at the third end and having an entrance end, and an adjuster mounted between the second end and the fourth end for adjusting an engaging extent therebetween. Such an optical fiber connector not only prevents a clearance between two coupled ferrules of two connectors from interrupting optical signals transmitted therethrough but also guards against an inadvertent detachment of the connector from the coupling housing when the connectors are coupled on the coupling housing. Besides, the pre-assemblage of the first and the second units are compatible among different types of the present connectors.

13 Claims, 11 Drawing Sheets

OPTICAL FIBER CONNECTOR HAVING AN ADJUSTABLE ENGAGING EXTENT

FIELD OF THE INVENTION

The present invention relates to an optical fiber connector, and more particularly to an optical fiber connector having an adjuster for adjusting an engaging extent.

BACKGROUND OF THE INVENTION

Optical fiber connector is a fundamental device among optical communicating systems, which is used by coupling two ferrule ends of such optical fiber connector in a coupling housing, or by joining the optical fiber connector to an optical device. An optical fiber cable generally includes a single optical fiber enclosed in a cladding made of polyvinyl chloride (PVC), a Kevlar fibrous material covering over the cladding as a strength member, and a coating applied over the strength member.

An optical fiber connector generally includes a plurality of exquisite parts for carrying therein the vulnerable optical fiber to precisely transmit optical signals therethrough. Nowadays, there are many connectors commercially applied for transmitting optical signals. One popular connector is an SC-type connector which includes an extension portion 101, a retention member 102, a cylindrical tube 103, a spring 104, a barrel 105, a plug 106, a plug frame 107 and a ring 109, as can be referred to in FIG. 1. The configuration is so designed that a key (not shown) provided on the outer surface of the plug 106 can align with the orientation of eccentricity of the ferrule bore, and the optical fiber cable is directly connected to the retention member 102 which is not directly connected to the ferrule assembly (a combination of the retention member 102, the tube 103, the spring 104 and the barrel 105). Another typical connector is ST-type, which includes a strain relief 201, a sleeve 203, a barrel 204, a spring 205, a ferrule assembly 206, a plug frame 207 and a ferrule end 208, as can be referred to in FIG. 2.

Figure 3:
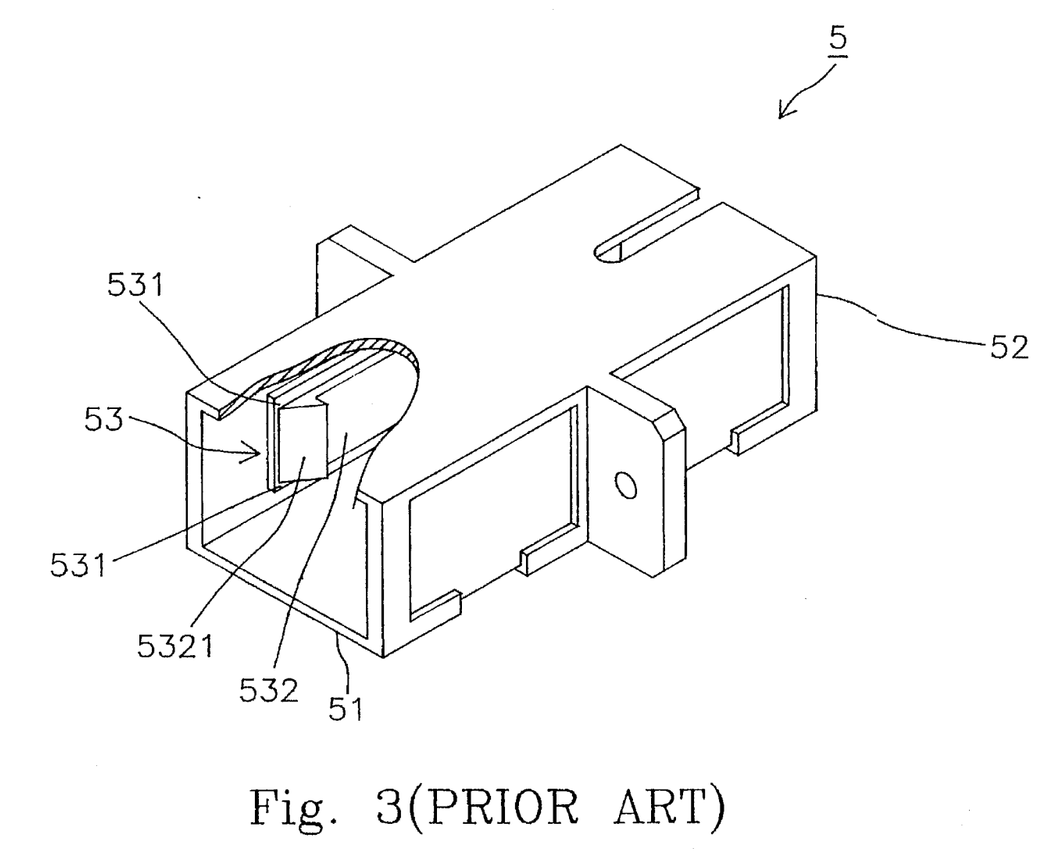
FIG. 3 is a perspective view schematically showing a prior coupling housing.

As will be discussed herewith, the application of the connector is to insert the ferrule end of one connector into a fixing device 53 on one side of the coupling housing 5 to optically connect with the ferrule end of another connector inserted from the other side of the coupling housing 5, as can be referred to in FIGS. 3 and 4.

Among relative optical fiber connectors for optical transmission, the elements of the connector disclosed in the R.O.C. Design No.: 211312 have to be respectively stored before assembled for use. As can be referred to in FIG. 1, the prior SC-type connector 1 as such has to be stayed in respective parts, instead of being detachably pre-assembled in a status of larger unit, in order for storage, which not only causes inconvenient management but also raises the transport cost. Also, in concerning the analysis of manufacturing conditions, the craftsman has to alternately machine and then sequentially engage these parts according to the predetermined procedure when on the assembly line, which is complicated and uneconomical due to the unavoidable reiterative manual and mechanical processings. Consequently, it is difficult to automatically achieve mass production as well as to control the product quality.

Figure 1:
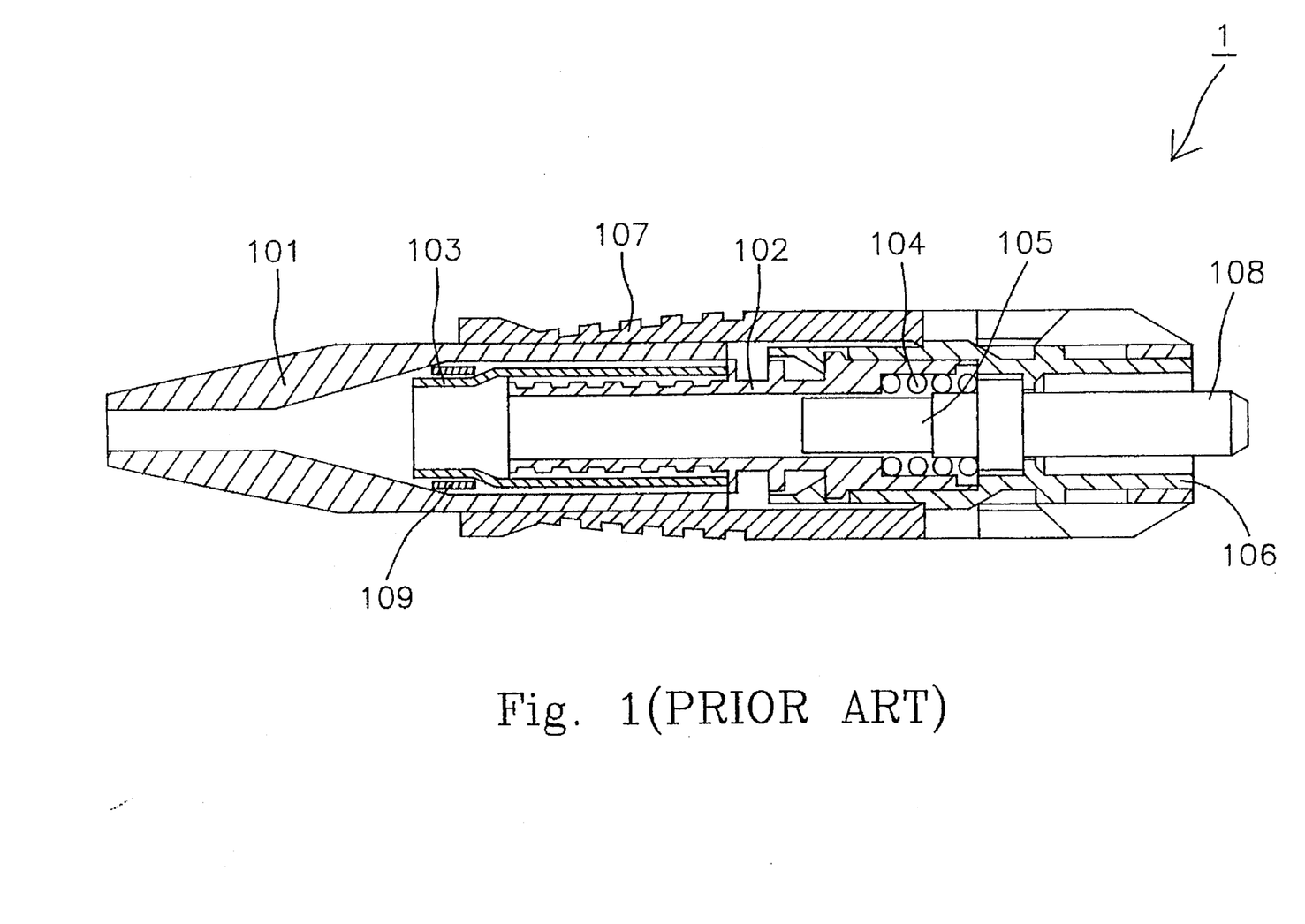
FIG. 1 is a sectional view showing a first prior embodiment of a connector.

Besides, during the assembly process that cures the fiber in the ferrule 108 by influxing therein an adhesive (such as an epoxy), if the retention member 102, the spring 104, the barrel 105 and the plug 106 are pre-assembled, the barrel 105 will stay inside the retention member 102 that will be difficult to influx the adhesive into the pores of the barrel 105. Even though the barrel 105 is made to extend over the end of the retention member 102, the adhesive will easily overflow the clearance formed between the retention member 102 and the barrel 105, then the spring 104 will be stuck with the retention member 102 and can not elastically provide a buffer for the two oppositely connected optical fiber ends to dispense the contact pressure therebetween.

Figure 2:
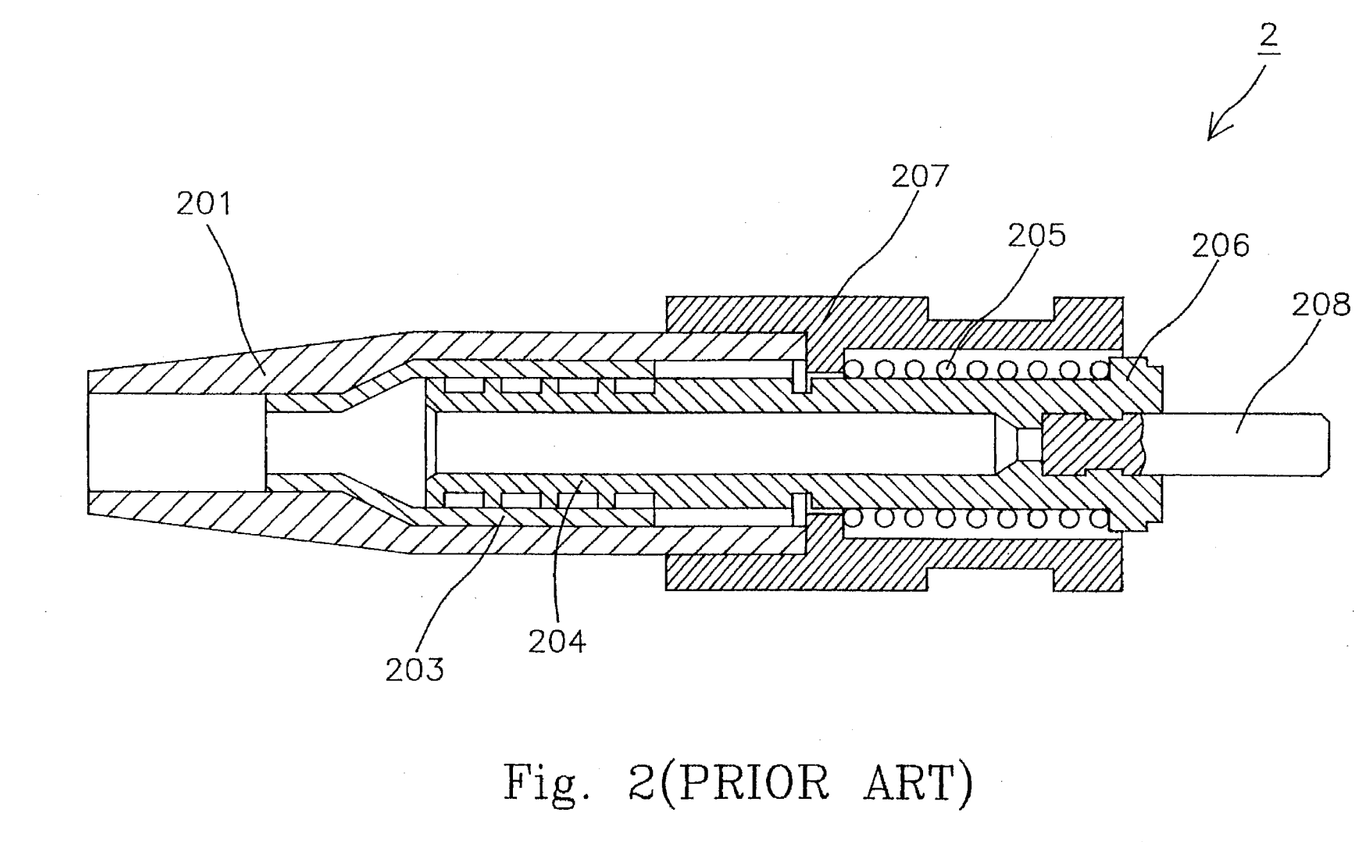
FIG. 2 is a sectional view showing a second prior embodiment of a connector.

Referring to FIG. 2, for example, the prior ST-type connector 2 may often subject to the limited space which compresses the crimped cable to shrink in the passageway and causes the optical fiber to be bent an adverse angle so as to accordingly obstruct the cable from moving with the ferrule assembly when a collision resulted from two end-to-end coupled connectors in a coupling housing that causes the respective connectors backwardly jerked a distance. As a result, the bent cable will seriously affect the transmitting effect. If, in this instance, the axially aligned plug frame and the cable is further subjected to a longitudinal external stretch, then the ferrule 208 and the retention member 203 can be exerted to move an axial displace to interrupt the optical transmission.

As a result, such above-mentioned structural defect may result in an ineffective combination of the separate parts to inconceivably deteriorate the anticipated optically transmitting functions. Generally, to overcome this potential defect, the end portion of the ferrule has to be extended in order to pass through the end of the retention member, the spring and the plug to become a whole connector. But, this will form a body having not enough structural strength to sustain the fiber due to the very free dimensions intensively engaged in such a limited space.

Other references of the relative prior arts, e.g., the R.O.C. Design No.: 179740, the R.O.C. Design No.: 216211, the R.O.C. Design No.: 251704, the U.S. Pat. No.: 4,812,009 by Carlisle et al. issued in 1989, the U.S. Pat. No.: 5,016,970 by Nagase et al. issued in 1991 and the U.S. Pat. No.: 5,212,752 by Stephenson et at. issued in 1993 do not disclose a design for preventing the connector from being inadvertently torn apart the coupling housing when in operation.

What is more, no matter the prior connectors are SC-type or ST-type though they all have their own specific characteristics, they often lack compatibility of themselves because the respective parts of each prior connector possess a unique design of dimensions, outlines, . . . , etc., and require special assembling tools and procedures.

Consequently, from the above considerations, except for the optical properties considered about the connecting quality between the two ferrule assembly ends, considerations for firmly disposing the connector in the coupling housing, a compatibility among different types of optical fiber connectors, and stable construction and structural protection to the related connecting quality are meditated herewith.

SUMMARY OF THE INVENTION

The main object of the present optical fiber connector is to provide an adjuster for adjusting an engaging extent so as to form a locking mechanism to prevent the connector being disconnected from a coupling housing when encountered an inadvertent external exertion.

Another object of the present invention is to provide an optical fiber connector capable of being pre-assembled to form larger separate units for saving storage space and convenient management.

In accordance with the present invention, an optical fiber connector adapted for connecting an optical fiber carried in the optical fiber connector to an optical cable, the connector comprises a plug, a ferrule assembly mounted in the plug, a retention member engaged with the plug, and having a first end and a second end, a resilient element mounted between the ferrule assembly and the retention member, a crimp member having a third end and a fourth end engaging with the second end, an extention member connecting thereto the optical cable, attached to the crimp member at the crimp member at the third end and having an entrance end, and an adjuster mounted between the second end and the fourth end for adjusting an engaging extent therebetween.

In accordance with a first aspect of the present invention, the adjuster includes a first securing device integrally formed to the second end, and a second securing device integrally formed to the fourth end.

In accordance with a second aspect of the present invention, the first securing device and the second securing device are screw threads.

In accordance with a third aspect of the present invention, the resilient element is a spring.

In accordance with a fourth aspect of the present invention, the retention member further includes a tab.

In accordance with a seventh aspect of the present invention, the plug frame further includes a circumferential hole for retaining the tab of the retention member when engaged with the plug frame so as to define therebetween a space for containing therein the ferrule assembly.

In accordance with an eighth aspect of the present invention, the ferrule assembly further comprises a barrel movably contained in the defined space and having on one end thereof a groove and on the other end thereof a collar, a sleeve mounted on the one end of the barrel, and a retainer secured in the groove.

In accordance with a ninth aspect of the present invention, the connector further comprises a plug frame having an inner space receiving therein the plug.

In accordance with a tenth aspect of the present invention, the optical fiber connector is disposed on one side of a coupling housing including therein a fixing device having a pair of shoulders and a jaw for securing the connector in order to optically connected with the other connector disposed on the other side of the coupling housing, the connector further comprises a plug frame having a stepped passageway and receiving therein said plug.

In accordance with an eleventh aspect of the present invention, the plug frame further includes a locking device.

In accordance with a twelfth aspect of the present invention, the locking device further includes a pair of noses, a guiding device for guiding therein the pair of shoulders, and an indentation.

In accordance with a thirteenth aspect of the present invention, the guiding device is a pair of rail having axial height difference.

In accordance with a fourteenth aspect of the present invention, the plug further includes a projection movably received in the indentation, a detent for engaging with the fixing device, and a saddle portion located between the projection and the detent for receiving the jaw when the connector is secured in the coupling housing.

In accordance with a fifteenth aspect of the present invention, the first and second screw threads are engaged to form a locking mechanism when the connector is secured in the coupling housing in order to prevent the connector from torn apart the coupling housing.

In accordance with a sixteenth aspect of the present invention, the crimp member and the extension member can be detachably pre-assembled to form a first unit, and the retention member, the ferrule assembly, the plug and the plug frame can be detachably pre-assembled to form a second unit in order to save a storage space.

The present invention may best be understood through the following description with reference to the accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 5:
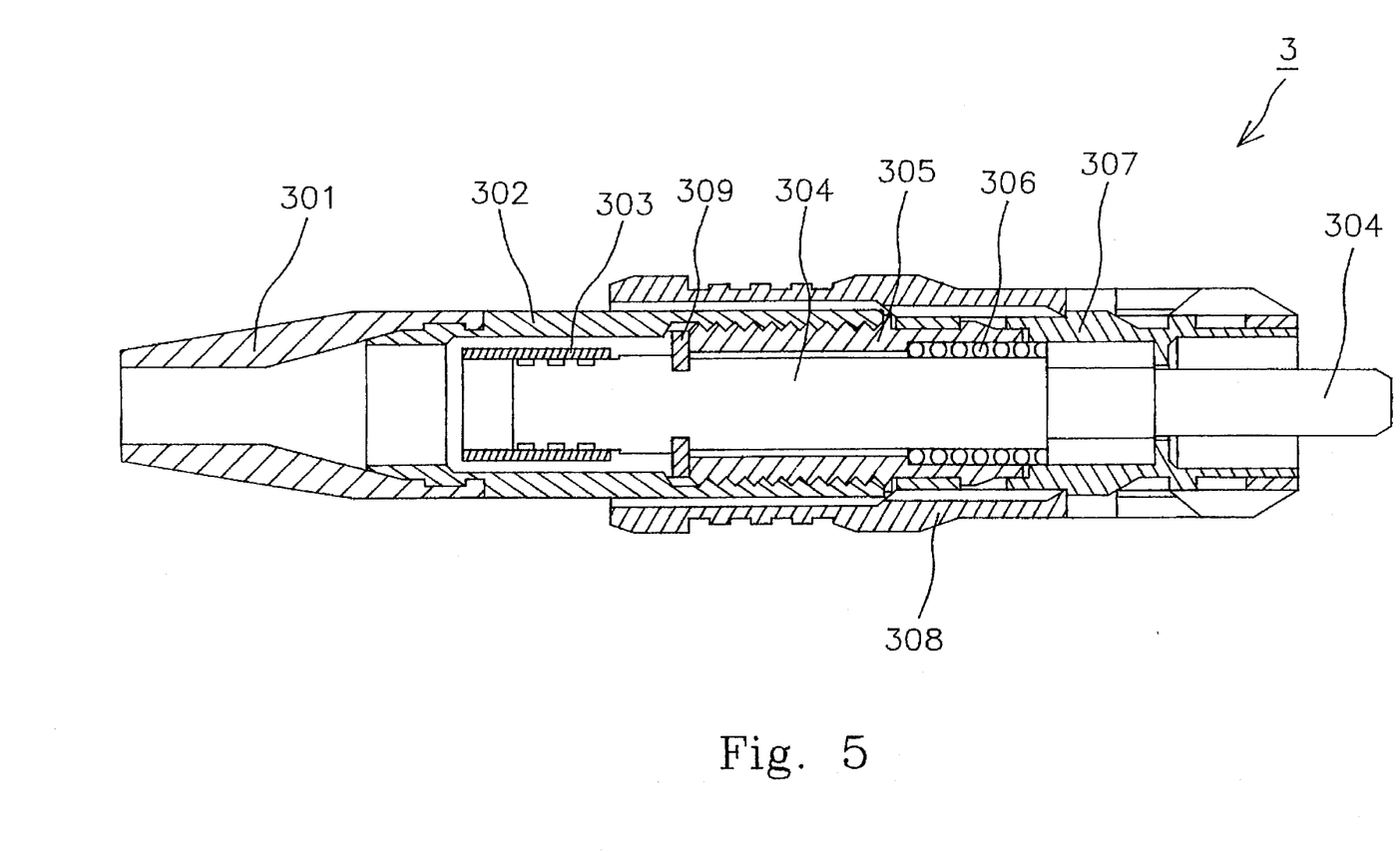
FIG. 5 is a sectional view showing a first preferred embodiment of a connector according to the present invention.
Figure 6:
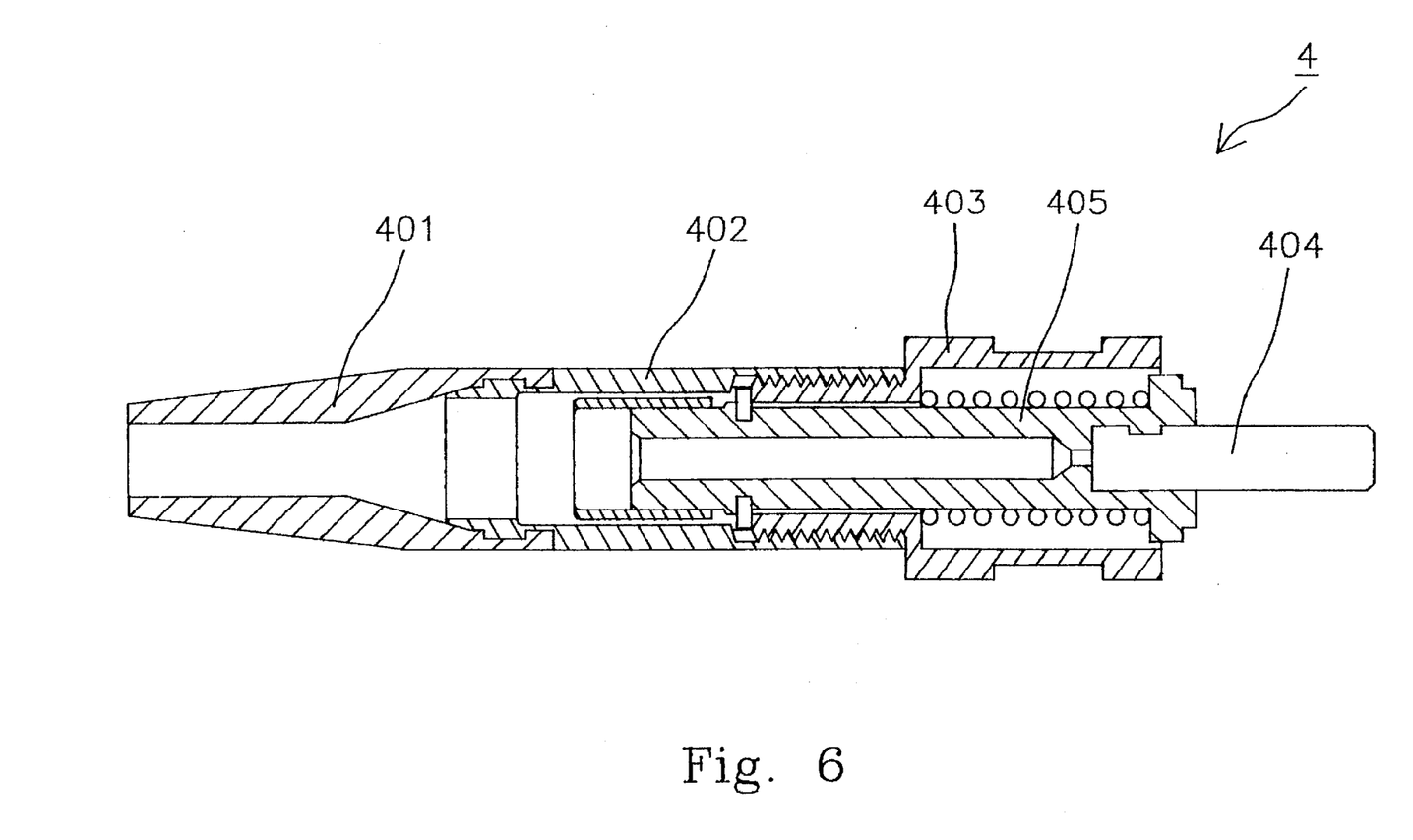
FIG. 6 is a sectional view showing a second preferred embodiment of a connector according to the present invention.
Figure 7:
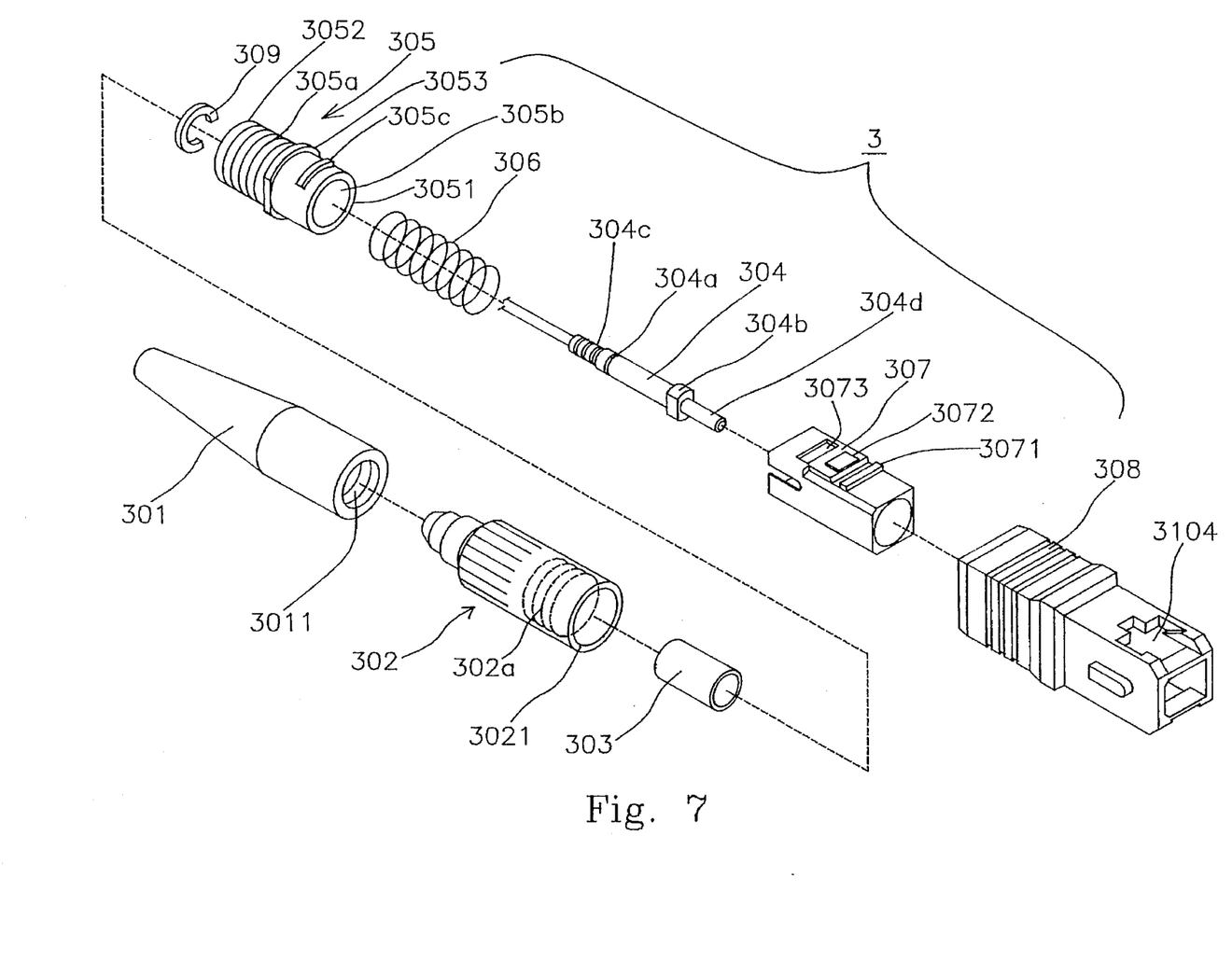
FIG. 7 is a schematic view showing disassembled parts of a preferred embodiment of a connector of the present invention.

Referring to FIGS. 5 and 6, a first and a second preferred embodiments of the present connectors 3 and 4 are assembled for use. Taking the connector 3 as an example, which includes from the left to the right an extension member 301, a crimp member 302, a sleeve 303, a barrel 304, a retainer 309, a retention member 305, a spring 306, a plug 307 and a plug frame 308. Also referring to FIG. 7, an independent ferrule assembly may be such defined as to include a barrel 304 having on one end thereof a groove 304a and on the other end thereof a collar 304b, a spring 306 sleeved along the barrel 304, a sleeve 303 mounted on the one end of the barrel 304 and a retainer 309 secured in the groove 304a. The connector further includes a plug frame 308 for securely containing therein the plug 307 which also receives therein the ferrule assembly.

The retention member 305 has a passageway 305b including a pocket, a pair of traversely projecting tabs 305c distributed on the opposite ends of the outer wall of the first end 3051, a first screw thread 305a provided on the outer wall of the second end 3052, and a flange 3053 having its skirt symmetrically cut on two opposite ends. The two cut ends of the flange 3053 are aligned perpendicular to the alignment of the two tabs 305c. The configuration of the plug 307 includes a pair of detents 3071 symmetrically projecting the outer wall on one end, a pair of the slight projections 3072 symmetrically provided at the middle part and a pair of circumferential holes 3073 at the other end for respectively retaining the two tabs 305c when engaged with the plug 307 so as to define therebetween a space for containing therein the ferrule assembly as can be referred to in FIGS. 5, 6 and 7. Accordingly, when the retention member 305 engages with the plug 307 and the retainer 309 is secured to the groove 304a, one can derive from the combination of the respective elements that the spring 306 is located between the pocket of the retention member 305 and the collar 304b of the barrel 304 for transferring an external exertion therebetween.

The crimp member 302 has a stepped passageway, and an entrance end 3021 provided on the inner wall a second screw thread 302a for detachably engaging with the first screw thread 305a of the retention member 305 in order to adjust an engaging extent therebetween. Upon the engagement of the retention member 305 and the crimp member 302, a space therebetween will be left for the sleeve 303 to accomplish the crimping action of the optical cable which reinforces the hook-up of the fiber in the ferrule assembly bore by axially crimping the Kevlar fibrous material of the cable between the ferrule end 304c and the sleeve 303. In addition, upon the collision of the ferrule when two ferrule ends 304d are inserted on the two sides 51 and 52 of the coupling housing 5 (as shown in FIG. 4), the resilient reaction of the spring 304 will press the ferrule assembly to intensively confine the sleeve 303 between the retainer 309 and the stepped end of the crimp member 302 until there is no more gap left among one another. Such that a buffer induced from the compressed spring 306 will always exist between the ferrule ends 304d to positively keep a proper optical transmission.

In addition, the connector 3 includes an extension member 301 having therein a passageway 3011 and attached to the crimp member 302 for sustaining the remaining part of the cable in order to shift an inadvertent strain to further provide a protection of the optical connection.

Figure 8A:
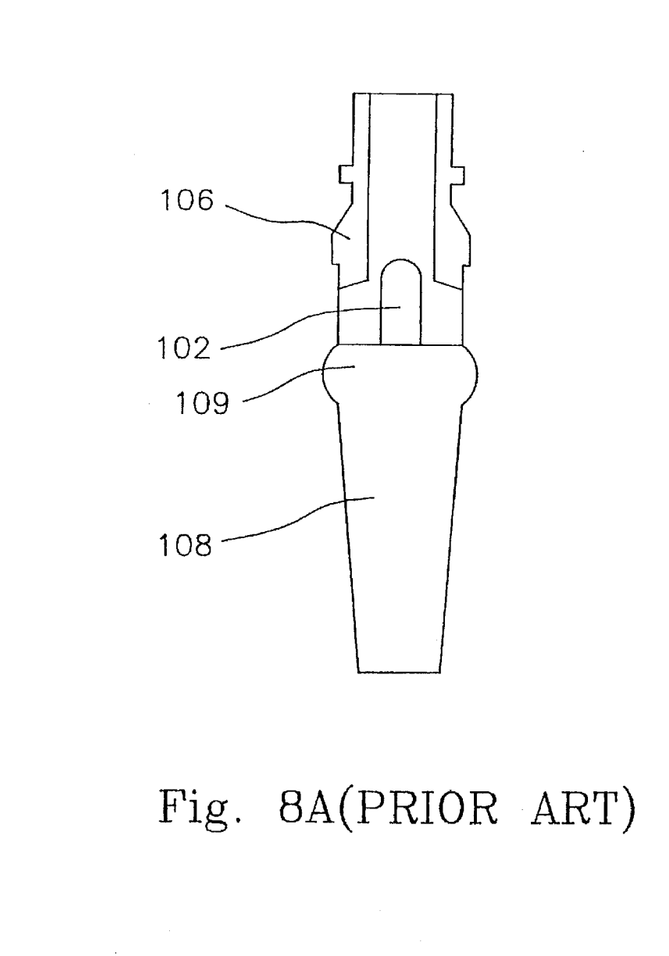
FIGS. 8A and 8B are schematic views showing a comparison of the outlines between the prior connector and the present connector.
Figure 8B:
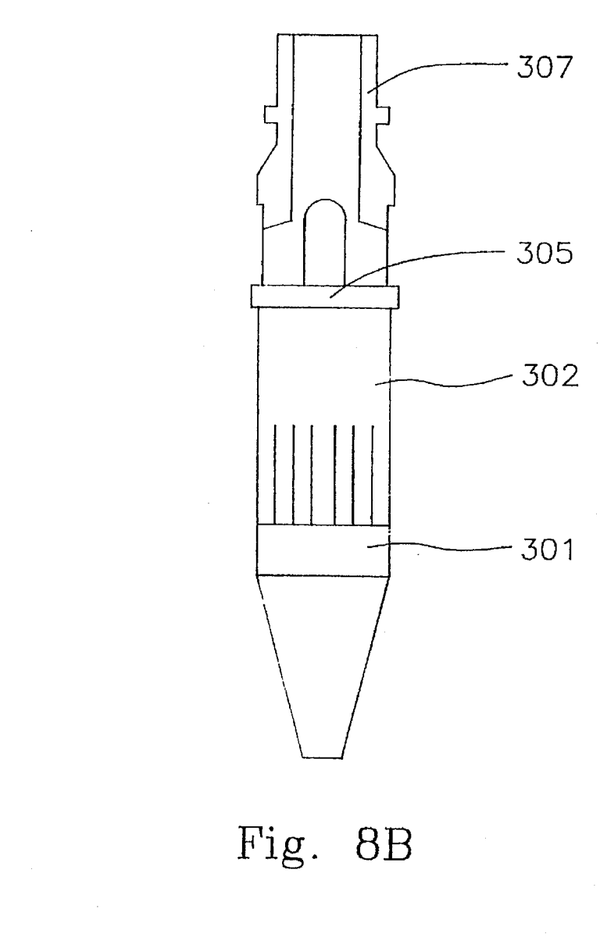

FIGS. 8A and 8B show a comparison of the outlines between the prior connector 1 and the present connector 3. As shown in FIG. 8A, the prior plug 106 has to smoothly axially slide along the passageway of the plug frame 107 in order to disengage the end-to-end connected optical fiber connectors. But, during the assemblage, gripping the PVC coating of the optical fiber cable with a terminal clamp will easily locally make a swell to result in a bulged portion in the tube 103 because of the ring 109. This will impede the plug 106 from smoothly moving along the passageway of the plug frame 107. As a result, one has to strenuously apply a force in order to disconnect the connector, which will easily injure the transmitting accuracy of the optical fiber and abrade the contact surfaces between two joint elements during the operation. On the contrary, referring to FIG. 8B, the engaged extension member 301 and crimp member 302 has a smooth joint portion along the respective passageways; besides, the inner diameter of the passageway of the extension member 301 is larger than the outer diameter of the optical cable. Consequently, if a retraction of the ferrule occurs, then the crimped optical cable will move with the pressed ferrule assembly along the passageways to advantageously avoid a shrunk optical cable.

Figure 4:
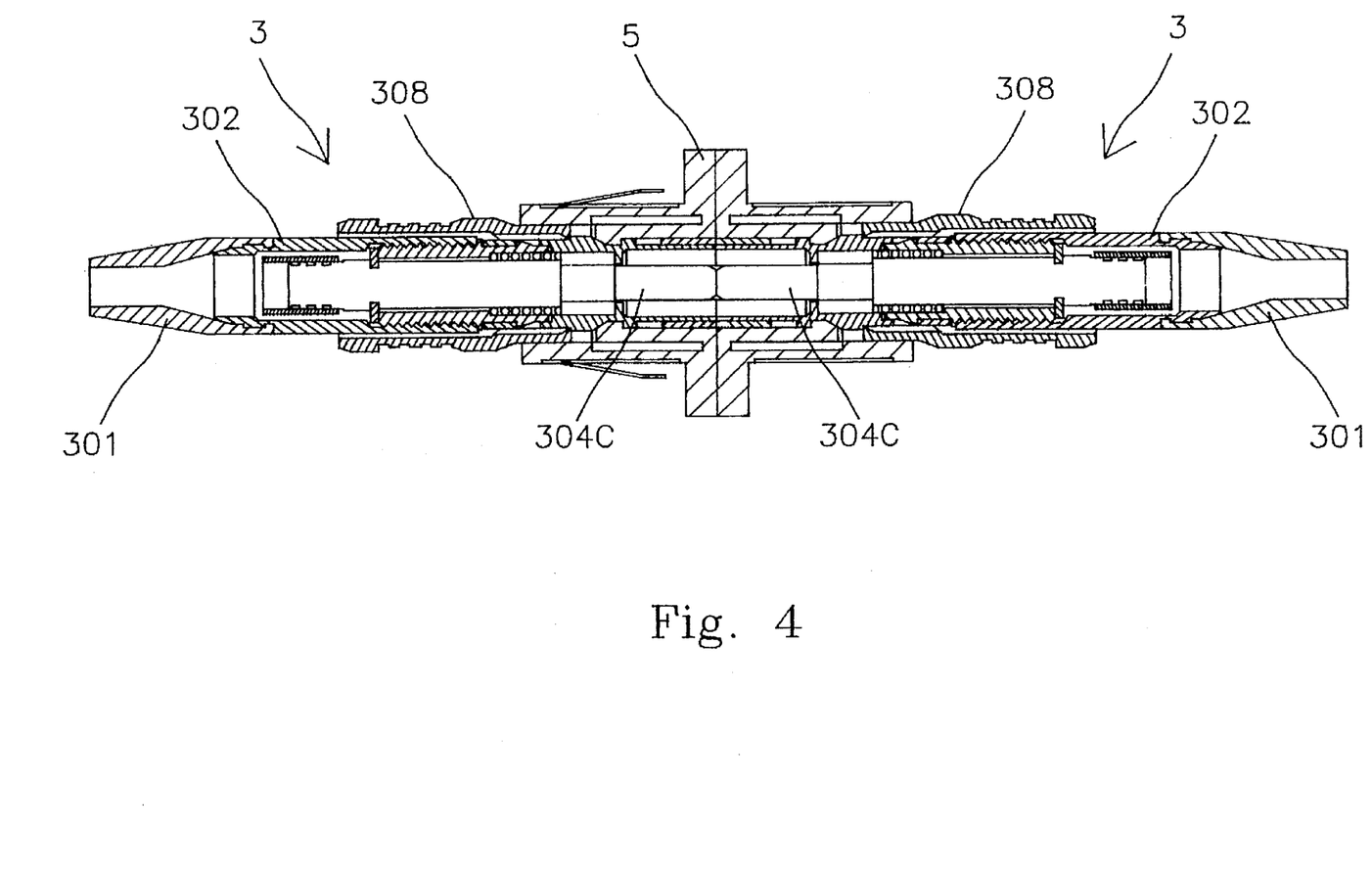
FIG. 4 is a sectional view showing a general application of two connectors disposed end-to-end in the coupling housing shown in FIG. 3.
Figure 9:
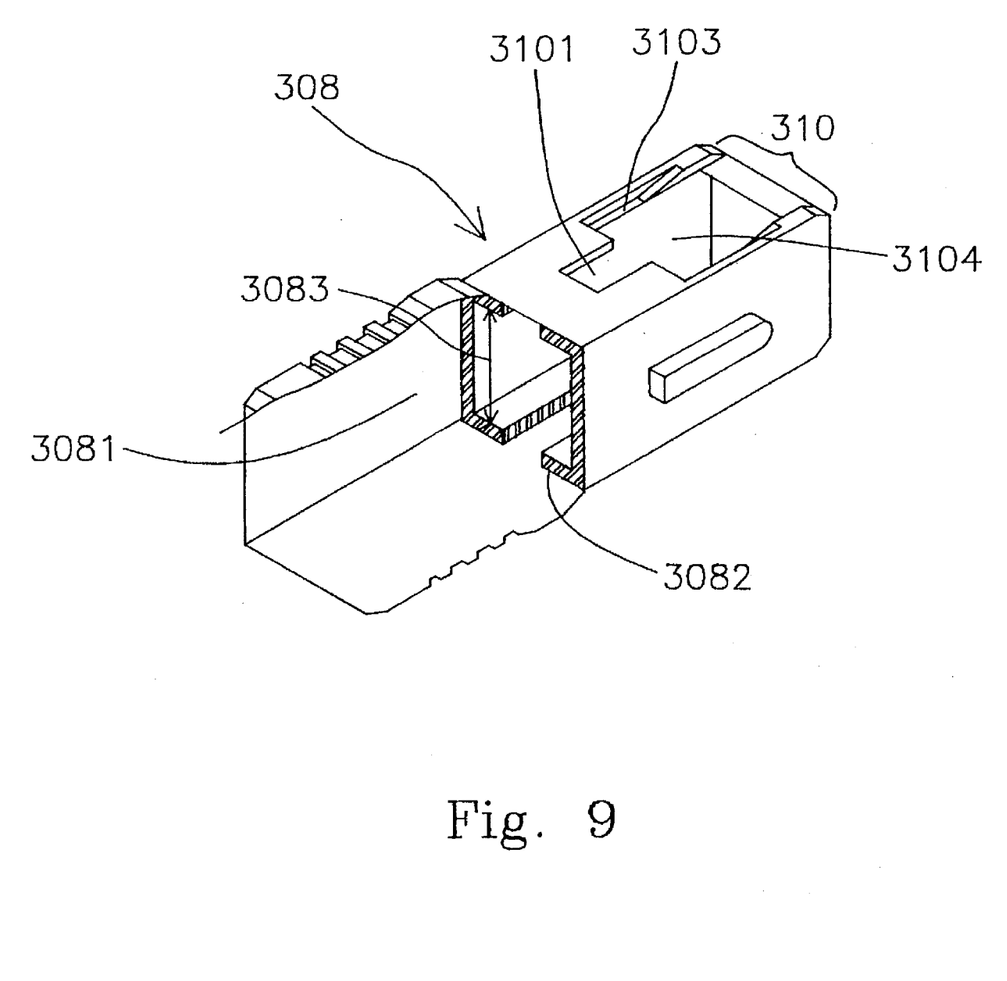
FIG. 9 is a exploded view schematically showing a configuration of the plug frame according to the present invention.
Figure 10:
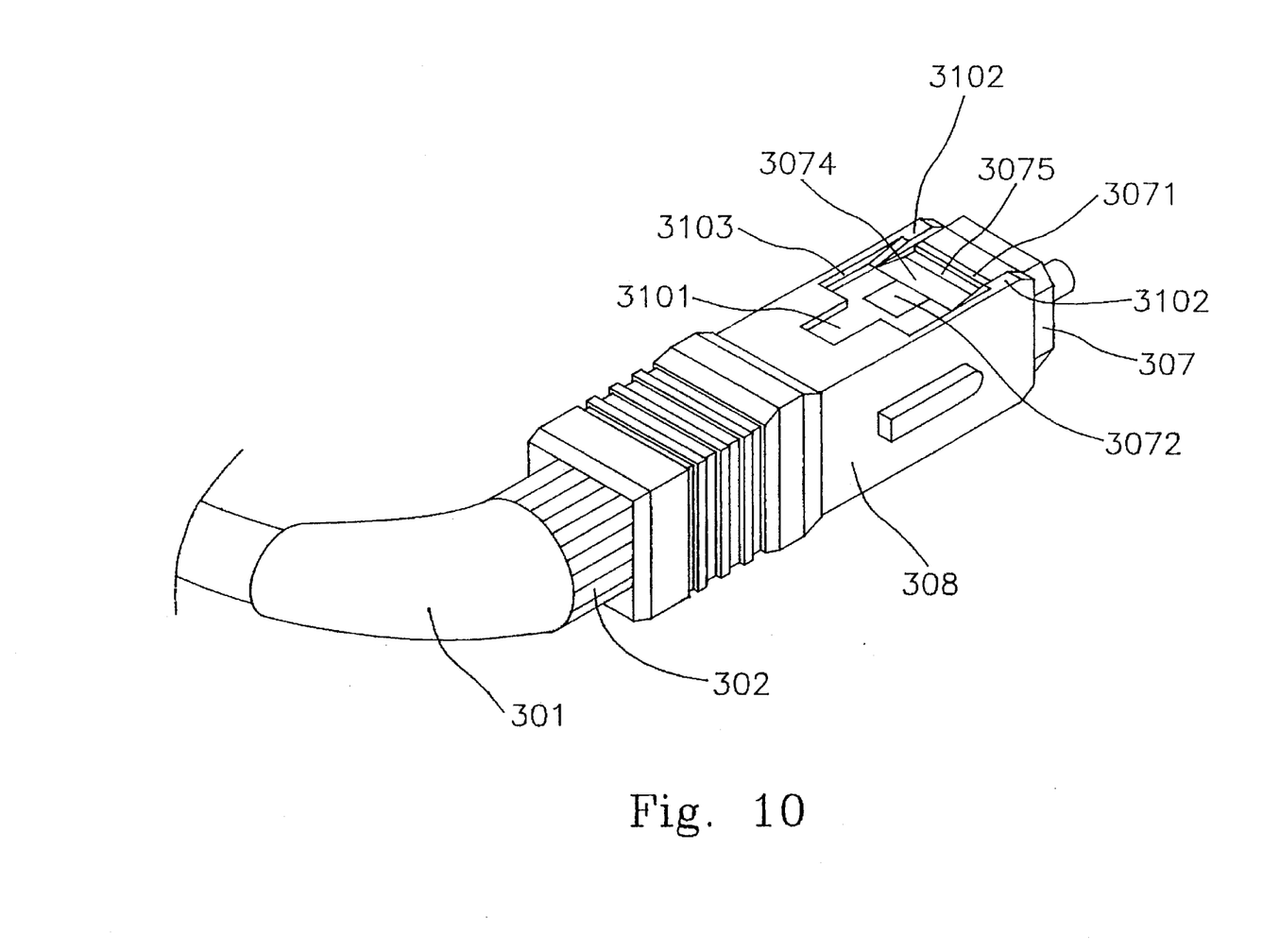
FIG. 10 is a perspective view showing a third embodiment of the present connector in use according to the present invention.

Preferably, referring to FIG. 9, the plug frame 308 further includes a pair of indentations 3101 provided on the locking devices 310 to be detachably engaged with the respective projections 3072 of the plug 307 in order to provide a tolerance in order for releasing the connector from the coupling housing 5 (as shown in FIG. 4). Referring to FIG. 10, the related designs include that the plug frame 308 has a stepped passageway 3081 having a step end 3082, and the sectional length 3083 of the stepped passageway 3081 is equal to the width between the two cut ends of the flange 3053. Such that those previously engaged plug 307, retention member 305, ferrule assembly, and optical cable can move along the stepped passageway 3081 when the plug 307 is secured within the plug frame 308.

Figure 11A:
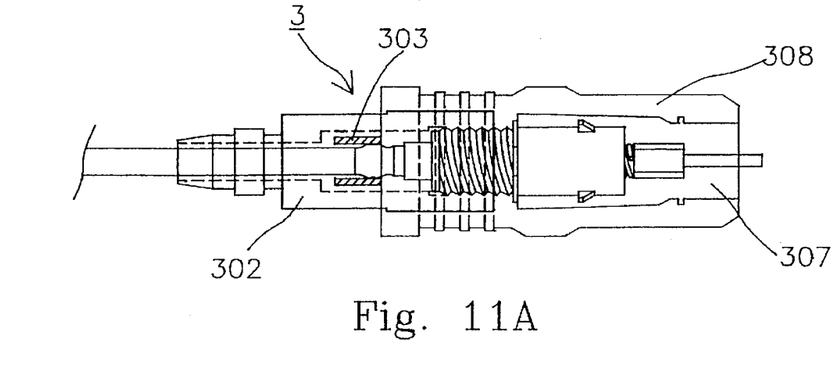
FIGS. 11A and 11B are sectional views respectively showing a fourth preferred embodiment of the present connector before and after the adjuster is tightly screwed when disposed in the coupling housing.
Figure 11B:
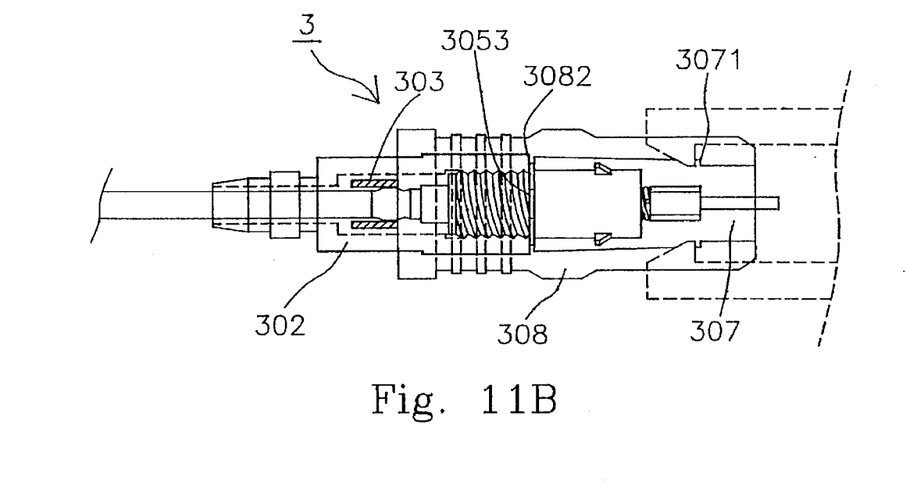

Referring to FIGS. 3, 4, 7, 9 and 10, the procedure for securing the connector into the coupling housing 5 is to correspondingly engage the respective pairs of the fixing devices 53 of the coupling housing 5 and the respective locking devices 310 of the plug time 308. Firstly, subjected to an insertion of the plug frame 308, the noses 3102 of the locking devices 310 prop apart the shoulders 531 of the fixing devices 53 to facilitate the insertion of the plug frame 308. Then, with respect to the shoulders 531 sliding down the slant rails 3103, the jaws 532 respectively push the plug 307 along at the escarpment 3074 for a distance same as the tolerance until the respective projections 3072 are stopped in the indentations 3071. Finally, the jaws 532 hook up to the respective detents 3071 with the two barbs 5321 resting in the respective saddles 3075 located between the detent 3071 and the escarpment 3074. Also referring to FIGS. 11A and 11B, if at this instance the entrance end 3021 of the crimp member 302 is tightly screwed up to contact with the cut flange 3053, then a locking mechanism, the hook-up between the detent 3071 and the barbs 5321 as well as the tightly screwed entrance end 3021 of the crimp member 302 contacted with the stepped end 3082, will prevent the engaged connector 3 from being recklessly detached. Preferably, to safely disengage the connector, one has to previously screw off the screw threads 302a and 305a of the adjuster for a distance no less than the above-mentioned tolerance, and then apply a pulling force to inversely release the connector from the coupling housing 5.

In accordance with another aspect of the present invention, the present invention is capable of being pre-assembled into larger units. Referring to FIG. 10, the plug 307 can be movably secured in the plug frame 308 by forcibly urging upon the two projections 3072 of the plug 307 to respectively fall into the openings 3104 of the locking devices 310. Then the engagement of the plug 307 and the retention member 305 can enclose therein the pre-assembled ferrule assembly to form a first unit. Once the combination of these respective elements is completed, they can not be disassembled into parts as before. On the other hand, the crimp member 302 and the extension member 301 can be detachably pre-assembled to form a second unit. Preferably, these two units of semi-products can be further detachably engaged by engaging the respective screw threads 302a and 305a of the present adjuster.

Referring to FIG. 6, which shows a second preferred embodiment of the present optical fiber connector 4 having another construction which includes from the left to the right an extension 401, retention member 402 and the first unit identical to that mentioned above. Due to the limited space of the connector, when the optical cable has to be vertically bent and is subjected to an external stretch, this type of connector will preferably fit for use. In such circumstance, the crimp member 402 can provide the optical cable a side guide to transfer a side loading of the exerted optical cable to the plug frame 403. Accordingly, the side loading will not act on the vulnerable ferrule 404 and the barrel 405 to advantageously avoid a malfunction of the signal transmitting.

To sum up, the present optical fiber connector provides an adjuster having two screw threads respectively mounted on the crimp member and the retention member to form a locking mechanism, which not only prevents a clearance between two coupled ferrules of two connectors from interrupting optical signals transmitted therethrough but also guard against an inadvertent detachment of the connector from the coupling housing when the connectors are coupled on the coupling housing. This greatly reduces the difficulty of the coupling techniques thereof. Further, the pre-assemblage of the two above-mentioned semi-products, the first unit of extension member and the crimp member as well as the second unit of the ferrule assembly, the retention member, the plug and the plug frame, are so designed to enhance the compatibility among different types of the optical fiber connectors (e.g., the present connectors 3 and 4 as respectively shown in FIGS. 6 and 7) to reduce the cost and save the storage space for convenient management.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical fiber connector adapted for connecting an optical fiber carried in said optical fiber connector to an optical cable, said connector comprising:

a plug;

a ferrule assembly mounted in said plug;

a retention member engaged with said plug, and having a first end and a second end;

a resilient element mounted between said ferrule assembly and said retention member;

a crimp member having a third end and a fourth end engaging with said second end;

an extension member connecting thereto said optical cable, said extension member being attached to said crimp member at said third end and having an entrance end; and an adjuster mounted between said second end and said fourth end of said crimp member for adjusting an engaging extent therebetween, wherein said connector is disposed on one side of a coupling housing including therein a fixing device having a pair of shoulders and a jaw for securing said connector in order to connect with another connector disposed on another side of said coupling housing, said connector further comprising a plug frame having a stepped passageway and receiving therein said plug.

2. A connector according to claim 1, wherein said adjuster includes:

a first securing device integrally formed to said second end; and a second securing device integrally formed to said fourth end.

3. A connector according to claim 2, wherein said first securing device and said second securing device are screw threads.

4. A connector according to claim 1, wherein said resilient element is a spring.

5. A connector according to claim 1, wherein said retention member further includes a tab.

6. A connector according to claim 5, wherein said plug further includes a circumferential hole for retaining said tab of said retention member when engaged with said plug so as to define therebetween a space for containing therein said ferrule assembly.

7. A connector according to claim 6, wherein said ferrule assembly further comprises:

a barrel movably contained in said defined space and having on one end thereof a groove and on the other end thereof a collar;

a sleeve mounted on said one end of said barrel; and a retainer secured in said groove.

8. A connector according to claim 1 wherein said crimp member and said extension member can be detachably pre-assembled to form a first unit, and said retention member, said ferrule assembly, said plug and said plug frame can be detachably pre-assembled to form a second unit in order to save a storage space.

9. A connector according to claim 1, wherein said plug frame further includes a locking device.

10. A connector according to claim 9, wherein said locking device further includes:

a pair of noses;

a guiding device for guiding therein said pair of shoulders; and an indentation.

11. A connector according to claim 10, wherein said guiding device is a pair of rails having axial height difference.

12. A connector according to claim 11, wherein said plug further includes:

a projection movably received in said indentation;

a detent for engaging with said fixing device; and a saddle portion located between said projection and said detent for receiving said jaw when said connector is secured in said coupling housing.

13. A connector according to claim 12, wherein a first and a second screw thread are engaged to form a locking mechanism when said connector is secured in said coupling housing in order to prevent said connector from being torn apart from said coupling housing.

* * * * *